Nov. 19, 1935.　　B. L. MALLORY　　2,021,658
ARM SHOCK ABSORBER
Filed Dec. 7, 1933　　2 Sheets-Sheet 1
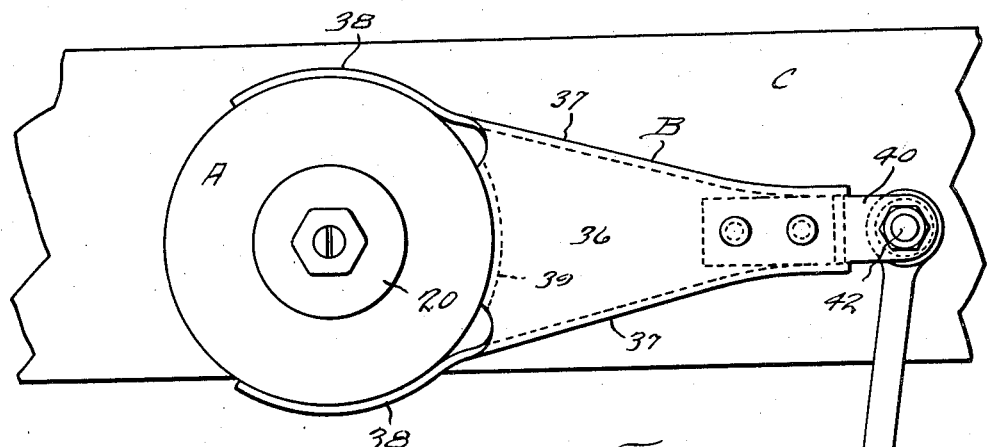
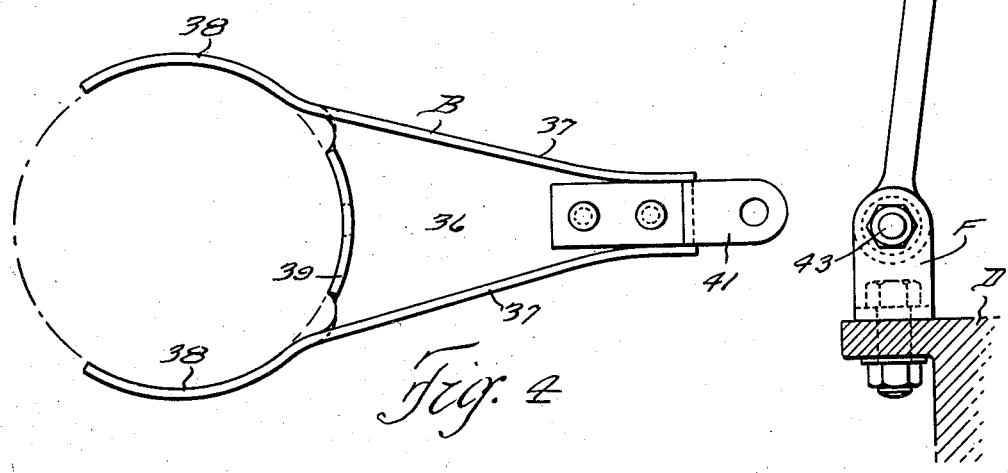
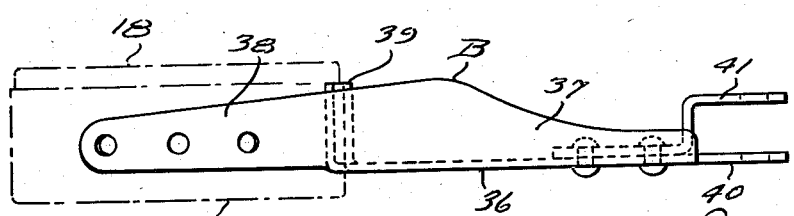
INVENTOR.
Bonnie L. Mallory
BY
ATTORNEY.

Nov. 19, 1935. B. L. MALLORY 2,021,658
ARM SHOCK ABSORBER
Filed Dec. 7, 1933 2 Sheets-Sheet 2

INVENTOR.
Bonnie L. Mallory
BY
ATTORNEY.

Patented Nov. 19, 1935

2,021,658

UNITED STATES PATENT OFFICE 2,021,658

ARM SHOCK ABSORBER

Bonnie L. Mallory, Cleveland Heights, Ohio, assignor to The Cleveland Shock Absorber Company, Cleveland, Ohio, a corporation of Ohio Application December 7, 1933, Serial No. 701,357

3 Claims. (Cl. 267—9)

This invention relates to improvements in shock absorbers of the type used on motor vehicles.

The principal object of the invention is to provide a shock absorber of the general type which has heretofore been provided with a flexible web for connection to the vehicle axle, the same being provided with an arm instead of such flexible web. More specifically stated, the object is to provide an arm shock absorber of the type indicated which will embody the advantageous features of the flexible web as well as those of the arm type and to overcome features of disadvantage in both types.

A further object is to provide in such a device an arm of such character that the housing will be relieved from strain whereby it may be made of lighter weight material.

A further object is to secure manufacture and operating simplicity and greater efficiency in use.

Figure 2:
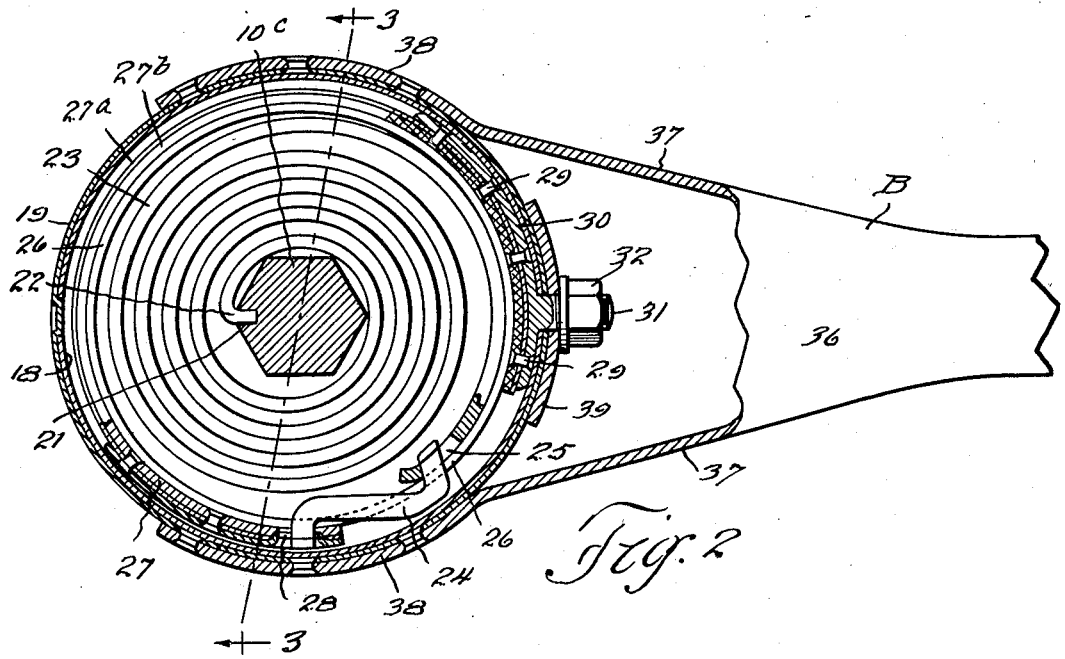
Figure 3:
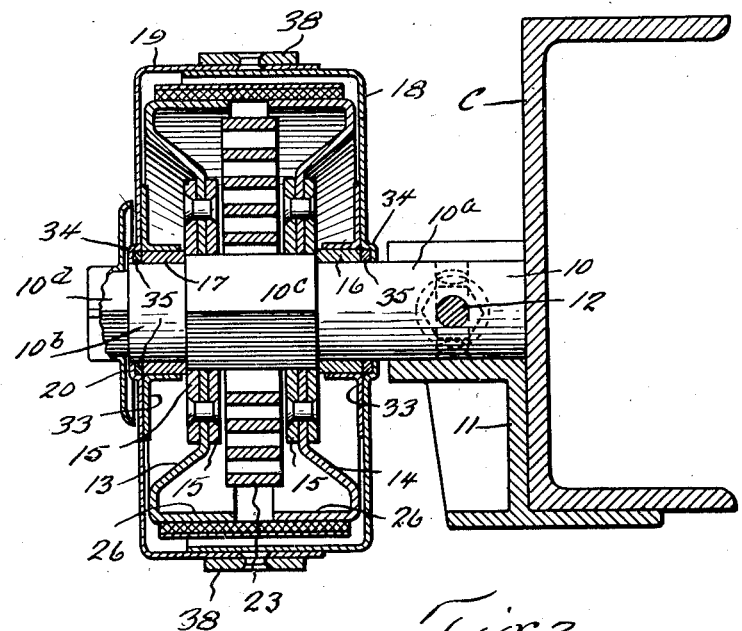

Other and more limited objects will become apparent from the following description when taken in connection with the accompanying drawings in which Fig. 1 is a side elevation; Fig. 2 is a fragmentary longitudinal section; Fig. 3 is a section on the line 3—3 of Fig. 2 and Figs. 4 and 5 are detail views at right angles to each other showing the construction of each arm.

By reference to Fig. 1 it will be seen that the device consists of a friction assembly A to which is connected an arm B. This assembly is mounted on the frame member C of a vehicle and is connected with the axle D thereof by means of a link E through the medium of a bracket F fixedly mounted on the axle D.

Referring now to Figs. 2 and 3, it will be seen that a shaft 10 is adjustably secured to the vehicle frame C by means of a fitting 11. The fitting 11 may be provided with a series of openings through which and the shaft 10 a pin 12 may extend. The shaft 10 may be provided with two or more intersecting openings adapted to receive the pin 12 and provide for a wide variety of adjustments. The shaft 10 is provided with cylindrical portions 10ª and 10ᵇ and polygonal portions 10ᶜ and 10ᵈ. Upon the portion 10ᶜ are press fitted two spaced drum sections 13 and 14, reinforced adjacent the shaft by plates 15. Journaled upon the cylindrical portions 10ª and 10ᵇ adjacent the portion 10ᶜ are bronze business 16 and 17 carried by housing sections 18 and 19. Upon the polygonal portion 10ᵈ is a dial member 20 which indicates the adjustment of the shaft 10 with respect to the frame member, the friction housing assembly being fixed with respect thereto except for its oscillation due to motion of the arm B. The portion 10ᶜ is provided with a milled slot 21 adapted to receive the bent over end portion 22 of a spiral spring 23.

A hook 24 is connected by means of a slot 25 with the spring 23, passes between the spaced friction flanges 26 of the drum members 13 and 14 and connects with one end of a friction band 27 by means of a slot 28 therein. The friction band 27 is made up of a thin flexible sheet metal strip 27ª and a friction lining 27ᵇ which may be composed of asbestos fabric or any other suitable material. The other end of the friction band 27 is connected as by rivets 29 with an anchoring member 30 which may consist of an arcuate portion provided with a threaded projection 31 adapted to receive a nut 32. The housing members 18 and 19, as already indicated, are provided with bronze bushings 16 and 17 journaled on the cylindrical portions of the shaft 10. These bushings have a driven fit with annular members 33 secured to such housing members and the housing members are provided with offsets 34 spaced from the ends of the bushings 16 and 17 for the accommodation of felt oil retainers 35.

The arm B is a sheet metal channel member having a web 36 and the side flanges 37 are provided with arcuate portions 38 extending beyond the end of the web 36 and embrace opposed quadrants of the housing member 19. The arcuate portions 38 are secured to the housing member 19 by rivets, spot welding or any other means. The web 36 is provided with an end flange 39 concentric with the arcuate portions 38. This end flange is provided with an opening adapted to receive the member 31 whereby the housing is clamped between the flange 39 and anchoring member 30. It should be noted that the member 30 extends such a distance from the member 31 as to bridge the space between the end flange 39 and the upper arcuate portion of the side flange 37 whereby to relieve the housing from strain. The arm B may be provided with an extension 40 extending beyond the side flanges 37 and a Z-shaped member 41 cooperating therewith to form a yoke for connection to the link E. The joints 42 and 43 may be provided with any suitable bushings, preferably rubber.

In operation, the spiral spring is tensioned sufficiently to cause the friction band to embrace the friction surfaces of the drum members. When the arm B moves downwardly the gripping action will be augmented and when it moves upwardly, the tension will be largely released. The housing members will be of such size with respect to the drum that there is but little space between them and the friction band. It will thus be seen that the component of the pull of the friction band which must be borne by the housing journals will be very small. It will also be observed that the arm itself is so constructed as to bear practically all of the stresses and that the portions 38 will be required to support substantially only tensional stresses.

From the foregoing, it will be clear that I have provided a device which is well adapted for its intended purposes and while I have shown and described the present preferred embodiment, I wish it understood that I am limited only in accordance with the appended claims.

Having thus described my invention, what I claim is:

1. In a shock absorber, a shaft, a drum fixed on said shaft, a housing member journaled on said shaft, a friction band encircling said drum and having one end anchored with respect to said housing, a spring connected between the other end of said friction band and said shaft and an arm secured to said housing member, said arm comprising a sheet metal channel member having its side flanges embracing opposed quadrants of said housing member and secured thereto, the web portion of said arm being turned up into an arcuate flange concentric to said web engaging flange portion and secured to said housing member, said side flanges extending beyond said arcuate flange.

2. In a shock absorber, a shaft, a drum fixed on said shaft, a housing member journaled on said shaft, a friction band encircling said drum and having one end anchored with respect to said housing, a spring connected between the other end of said friction band and said shaft and an arm secured to said housing member, said arm being provided with side flanges and an end flange, said flanges having arcuate, concentric portions embracing said housing members and secured thereto, said side flanges extending beyond said arcuate flange and said end flange being secured to the housing member by means of a threaded projection on an arcuate anchoring member, said anchoring member being secured to said friction band and extending between the same and said housing member.

3. In a shock absorber, a shaft, a drum fixed on said shaft, a housing member journaled on said shaft, a friction band encircling said drum and having one end anchored with respect to said housing, a spring connected between the other end of said friction band and said shaft and an arm secured to said housing member, said arm being provided with side flanges and an end flange, said flanges having arcuate, concentric portions embracing said housing members and secured thereto, said side flanges extending beyond said arcuate flange and said end flange being secured to the housing member by means of a threaded projection on an arcuate anchoring member, said anchoring member being secured to said friction band and extending between the same and said housing member and bridging the space between said end flange and an arcuate portion of a side flange.

BONNIE L. MALLORY.